US012518957B2

(12) United States Patent
Kudo

(10) Patent No.: US 12,518,957 B2
(45) Date of Patent: Jan. 6, 2026

(54) ORTHOGONAL ACCELERATION TIME-OF-FLIGHT MASS SPECTROMETER

(71) Applicant: SHIMADZU CORPORATION, Kyoto (JP)

(72) Inventor: Tomoya Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 398 days.

(21) Appl. No.: 18/025,108

(22) PCT Filed: Dec. 4, 2020

(86) PCT No.: PCT/JP2020/045245
§ 371 (c)(1),
(2) Date: Mar. 7, 2023

(87) PCT Pub. No.: WO2022/118462
PCT Pub. Date: Jun. 9, 2022

(65) Prior Publication Data
US 2023/0377869 A1 Nov. 23, 2023

(51) Int. Cl.
*H01J 49/06* (2006.01)
*H01J 49/24* (2006.01)
*H01J 49/40* (2006.01)

(52) U.S. Cl.
CPC .......... *H01J 49/401* (2013.01); *H01J 49/068* (2013.01); *H01J 49/24* (2013.01)

(58) Field of Classification Search
CPC ......... H01J 49/24; H01J 49/401; H01J 49/068
See application file for complete search history.

(56) References Cited

U.S. PATENT DOCUMENTS 6,987,264 B1 * 1/2006 Whitehouse .......... H01J 49/063 250/292
10,438,781 B2 * 10/2019 Yamaguchi ............. H01J 49/40
(Continued)

FOREIGN PATENT DOCUMENTS

JP 6202214 B2 9/2017
WO 2016/042632 A1 3/2016
(Continued)

OTHER PUBLICATIONS

"Machinable Ceramics Characteristics Table", [Online], [Searched on Oct. 27, 2020], Ferrotec Material Technologies Corporation, Internet.

(Continued)

*Primary Examiner* — Wyatt A Stoffa
(74) *Attorney, Agent, or Firm* — Sughrue Mion, PLLC

(57) ABSTRACT

An orthogonal acceleration time-of-flight mass spectrometer includes: a first vacuum chamber and a second vacuum chamber; an insulating spacer member; a former-stage-side ring electrode; subsequent-stage-side ring electrodes; a first fixation member including a first displacement member to displace a central axis of the former-stage-side ring electrode and the subsequent-stage-side ring electrodes in a predetermined direction orthogonal to the central axis by thermal expansion; and a second fixation member including a second displacement member to displace the central axis in the predetermined direction orthogonal to the central axis by thermal expansion, a difference between a thermal expansion amount of the first displacement member per unit temperature and a thermal expansion amount of the second displacement member per unit temperature being 30% or less of the thermal expansion amount of the first displacement member.

9 Claims, 6 Drawing Sheets

(56) References Cited

U.S. PATENT DOCUMENTS

| | | | | |
|---|---|---|---|---|
| 10,755,914 | B2 * | 8/2020 | McCauley | H01J 49/4295 |
| 10,991,566 | B2 * | 4/2021 | Kudo | H01J 49/446 |
| 11,201,046 | B2 * | 12/2021 | Kudo | H01J 49/401 |
| 11,443,934 | B2 * | 9/2022 | Kudo | H01J 49/40 |
| 2002/0100870 | A1 * | 8/2002 | Whitehouse | H01J 49/40 250/281 |
| 2008/0121797 | A1 * | 5/2008 | Wu | G01N 27/623 250/288 |
| 2014/0264011 | A1 * | 9/2014 | Welkie | H01J 49/403 315/506 |
| 2017/0110311 | A1 * | 4/2017 | Reilly | H01J 49/429 |
| 2017/0278691 | A1 | 9/2017 | Okumura | |
| 2021/0125819 | A1 | 4/2021 | Kudo et al. | |
| 2021/0142999 | A1 | 5/2021 | Kudo et al. | |
| 2021/0210327 | A1 | 7/2021 | Kudo | |
| 2021/0249248 | A1 | 8/2021 | Kudo | |
| 2024/0055250 | A1 * | 2/2024 | Stewart | H01J 49/24 |

FOREIGN PATENT DOCUMENTS

| | | | |
|---|---|---|---|
| WO | 2019/220497 | A1 | 11/2019 |
| WO | 2019/220554 | A1 | 11/2019 |
| WO | 2019/224948 | A1 | 11/2019 |
| WO | 2019/229864 | A1 | 12/2019 |

OTHER PUBLICATIONS

International Search Report for PCT/JP2020/045245 dated Feb. 2, 2021 [PCT/ISA/210].

Written Opinion for PCT/JP2020/045245 dated Feb. 2, 2021 [PCT/ISA/237].

* cited by examiner

ORTHOGONAL ACCELERATION TIME-OF-FLIGHT MASS SPECTROMETER

CROSS REFERENCE TO RELATED APPLICATIONS

This application is a National Stage of International Application No. PCT/JP2020/045245 filed Dec. 4, 2020.

TECHNICAL FIELD

The present invention relates to an orthogonal acceleration time-of-flight mass spectrometer.

BACKGROUND ART

In a time-of-flight mass spectrometer (TOF-MS), a predetermined kinetic energy is given to a group of ions originating from a sample component, the ion group is made to fly a certain distance of space, and a mass-to-charge ratio of each ion contained in the ion group is obtained from the time of flight of the ion. At this time, if there is a variation in the initial energy (initial flight velocity) among the ions, a variation in the time of flight occurs among the ions having the same mass-to-charge ratio, which causes a deterioration in a mass-resolving power. To solve such a problem, an orthogonal acceleration-type time-of-flight mass spectrometer (orthogonal acceleration time-of-flight mass spectrometer) is used (for example, Patent Literature 1 to 4). In the orthogonal acceleration time-of-flight mass spectrometer, an ion group is made incident to an orthogonal acceleration section having an expulsion electrode and a lead-in electrode, and the ion group is accelerated in a direction orthogonal to the incident direction of the ion group so as to eliminate the influence of the variation in the flight velocity in the incident direction, so that the mass-resolving power is improved.

The orthogonal acceleration time-of-flight mass spectrometer includes: an ionization chamber in which an ion source is disposed; an intermediate vacuum chamber in which a transport optical system configured to transport an ion group generated by the ion source and a collision cell configured to dissociate ions having a predetermined mass-to-charge ratio contained in the ion group are disposed; and an analysis chamber in which the ion group introduced from the transport optical system flies. The intermediate vacuum chamber and the analysis chamber are provided in a vacuum chamber. The ionization chamber, the intermediate vacuum chamber and the analysis chamber constitute a differential exhaust-type configuration in which the degree of vacuum increases in this order, and each chamber is partitioned by a bulkhead member in which an ion passing part is formed.

In the orthogonal acceleration time-of-flight mass spectrometer, a transfer electrode is disposed at a boundary between the intermediate vacuum chamber and the analysis chamber in order to transport ions from the intermediate vacuum chamber to the analysis chamber (for example, Patent Literature 1 to 4). The transfer electrode is formed by arranging a plurality of ring electrodes in a direction of their central axis with an insulating spacer between them, and the ring electrode located on the frontmost stage side (ion source side) is disposed in the intermediate vacuum chamber, and the ring electrodes located after that are disposed in the analysis chamber. The transfer electrode is fixedly positioned by fixing an insulating spacer to an opening formed in the bulkhead member between the intermediate vacuum chamber and the analysis chamber, and fixing the ring electrode positioned at the rearmost stage to a wall of the vacuum chamber in the analysis chamber. In order to fix the ring electrode located at the rearmost stage, a fixation member at least partially made of an insulating material is used to insulate the ring electrode from the vacuum chamber. The transfer electrode is precisely positioned such that the central axis (ion optical axis) of the plurality of ring electrodes pass through the center of the opposing faces of the expulsion electrode and the lead-in electrode of the orthogonal acceleration section, and is parallel to both the opposing faces.

CITATION LIST

Patent Literature

Patent Literature 1: WO 2016/042632 A
Patent Literature 2: WO 2019/220554 A
Patent Literature 3: WO 2019/224948 A
Patent Literature 4: WO 2019/229864 A
Patent Literature 5: WO 2019/220497 A

Non Patent Literature

Non Patent Literature 1: "Machinable Ceramics Characteristics Table", [Online], [Searched on Oct. 27, 2020], Ferrotec Material Technologies Corporation, Internet

SUMMARY OF INVENTION

Technical Problem

In an orthogonal acceleration time-of-flight mass spectrometer, the flight path of ions is defined by a flight tube disposed in an analysis chamber. Since the flight tube expands or contracts with a temperature change, the length of the flight path changes if the temperature at a time of mass spectrometry changes. Then, the flight time varies and the mass accuracy deteriorates even if the ions are the same. In order to prevent such deterioration in mass accuracy, Patent Literature 3 discloses that the analysis chamber is heated and the temperature is controlled to a predetermined value between 35° C. and 50° C.

Orthogonal acceleration time-of-flight mass spectrometers are assembled in a factory in a room temperature (e.g., 25° C.) environment. Therefore, when the analysis chamber is heated and temperature controlled to the previously described temperature, the members positioning and fixing the transfer electrode thermally expand. The transfer electrode is positioned and fixed with respect to the vacuum chamber on a former stage side and on a subsequent stage side as described above. Usually, the material and the size of the members used to fix the transfer electrode on the former stage side are different from the material and the size of the members used to fix the transfer electrode on the subsequent stage side. In many cases, the vacuum chamber is made of aluminum, and as the members for fixing the transfer electrode, for example, a combination of a conductive member made of aluminum and an insulating member made of polyether ether ketone (PEEK) is used. The thermal expansion coefficient of PEEK resin is larger than that of aluminum. Therefore, when assembling the device in the factory, even if the transfer electrode is correctly positioned with high accuracy so that the ion optical axis passes through the center of the opposing faces between the expulsion electrode and the lead-in electrode of the orthogonal acceleration section and is parallel to the opposing faces, a deviation occurs in the ion optical axis because the thermal expansion of each member is different when the analysis chamber is heated at the time of mass analysis. When such a deviation occurs in the ion optical axis, the device performance such as mass-resolving power, ion detection sensitivity, and mass accuracy deteriorates.

In order to solve the above problem, the temperature at the time of manufacturing a mass spectrometer may be matched with the temperature at the time of analysis. However, the heating temperature at the time of analysis should be determined depending on the environment or the state of the device at the time of performing the analysis, so that the target temperature at the time of temperature control of the mass spectrometer is made to be set at an appropriate value (for example, Patent Literature 5). Therefore, it is not possible to match the temperature at the time of manufacturing the mass spectrometer with the temperature at the time of analysis.

In addition, for example, when an orthogonal acceleration time-of-flight mass spectrometer is transported from its manufacturing place to an overseas delivery destination, a container is used during sea freight or air freight. The temperature inside the container for such a freight operation may change across a wide range of 5° C. to 50° C. In such a case, each member thermally expands (or contracts) due to such a temperature change that may occur during the transport process, and the fixed position between the members irreversibly changes. Thus the ion optical axis may deviate in the same manner as described above, and device performance such as mass-resolving power, ion detection sensitivity, and mass accuracy deteriorates.

The problem to be solved by the present invention is to provide an orthogonal acceleration time-of-flight mass spectrometer in which a deviation is less likely to occur in an ion optical axis even in a case where a temperature at the time of assembly of the device is different from a temperature at the time of use of the device or in a case where a target temperature of temperature adjustment of the flight tube is changed.

Solution to Problem

An orthogonal acceleration time-of-flight mass spectrometer according to the present invention made to solve the above problems includes:

- a vacuum chamber in which an internal space is partitioned into a first vacuum chamber and a second vacuum chamber;
- an insulating spacer member disposed in and between the first vacuum chamber and the second vacuum chamber;
- a former-stage-side ring electrode fixed to a side of the insulating spacer member on the first vacuum chamber;
- a plurality of subsequent-stage-side ring electrodes fixed to a side of the insulating spacer member on the second vacuum chamber and connected to each other via a connecting member having an insulation property;
- a first fixation member configured to position the insulating spacer member with respect to a predetermined position in the second vacuum chamber, the first fixation member including a first displacement member configured to displace a central axis of the former-stage-side ring electrode and the subsequent-stage-side ring electrodes in a predetermined direction orthogonal to the central axis by thermal expansion; and
- a second fixation member configured to position one of the plurality of subsequent-stage-side ring electrodes with respect to the predetermined position, the second fixation member including a second displacement member configured to displace the central axis in the predetermined direction orthogonal to the central axis by thermal expansion, a difference between a thermal expansion amount of the first displacement member per unit temperature and a thermal expansion amount of the second displacement member per unit temperature being 30% or less of the thermal expansion amount of the first displacement member.

The central axis of the former-stage-side ring electrode and the subsequent-stage-side ring electrodes are designed such that the central axis corresponds to the central axis (ion optical axis) of the ion flight path. The first displacement member may be the same as the first fixation member, or may be a part of the first fixation member. In addition, the second displacement member may be the same as the second fixation member, or may be a part of the second fixation member. When the orthogonal acceleration time-of-flight mass spectrometer is designed, the ion optical axis is determined so as to transport ions flying from the former stage of the transfer electrode to a predetermined position in the subsequent stage of the transfer electrode at a predetermined angle (typically, straight to the center between the expulsion electrode and the lead-in electrode constituting the orthogonal acceleration section). Positioning the insulating spacer member and the subsequent-stage-side ring electrode with respect to a predetermined position in the second vacuum chamber means disposing the insulating spacer member and the subsequent-stage-side ring electrode such that the ion optical axis is positioned as in the above design.

Advantageous Effects of Invention

In an orthogonal acceleration time-of-flight mass spectrometer according to the present invention, an insulating spacer member is disposed in and between a first vacuum chamber and a second vacuum chamber partitioned in a vacuum chamber. The insulating spacer member is fixed to a predetermined position in the second vacuum chamber by a first fixation member. The first fixation member includes a first displacement member configured to displace the central axis of the former-stage-side ring electrode and the subsequent-stage-side ring electrodes in a predetermined direction orthogonal to the central axis by thermal expansion. In addition, the former-stage-side ring electrode is fixed to a side of the insulating spacer member on the first vacuum chamber, and the plurality of subsequent-stage-side ring electrodes are fixed to a side of the insulating spacer member on the second vacuum chamber. Furthermore, one of the plurality of subsequent-stage-side ring electrodes (typically, the ring electrode located at the rearmost stage) is fixed to the predetermined position by the second fixation member. The second fixation member also includes a second displacement member configured to displace the central axis of the former-stage-side ring electrode and the subsequent-stage-side ring electrodes in the predetermined direction orthogonal to the central axis by thermal expansion. Furthermore, a difference between a thermal expansion amount of the first displacement member (sum of product of the length in the predetermined direction and the thermal expansion coefficient of each member constituting the first displacement member) per unit temperature (one degree) and a thermal expansion amount of the second displacement member (sum of product of the length in the predetermined direction and the thermal expansion coefficient of each member constituting the second displacement member) per unit temperature is 30% or less of the thermal expansion amount of the first displacement member. Therefore, even in a case where the temperature at the time of assembly of the device is different from the temperature at the time of use, in a case where a target temperature of the temperature control of a flight tube is changed, or in a case where a temperature change occurs in the transport process of the device, the difference between the expansion amount and the contraction amount of both displacement members is small, so that the deviation of the ion optical axis is suppressed, and it is possible to suppress deterioration of device performance such as mass-resolving power, ion detection sensitivity, and mass accuracy.

DESCRIPTION OF EMBODIMENTS

One embodiment of an orthogonal acceleration time-of-flight mass spectrometer according to the present invention will be described below with reference to the drawings. In the following, the orthogonal acceleration time-of-flight mass spectrometer of the present embodiment is also referred to simply as "mass spectrometer".

Figure 1:
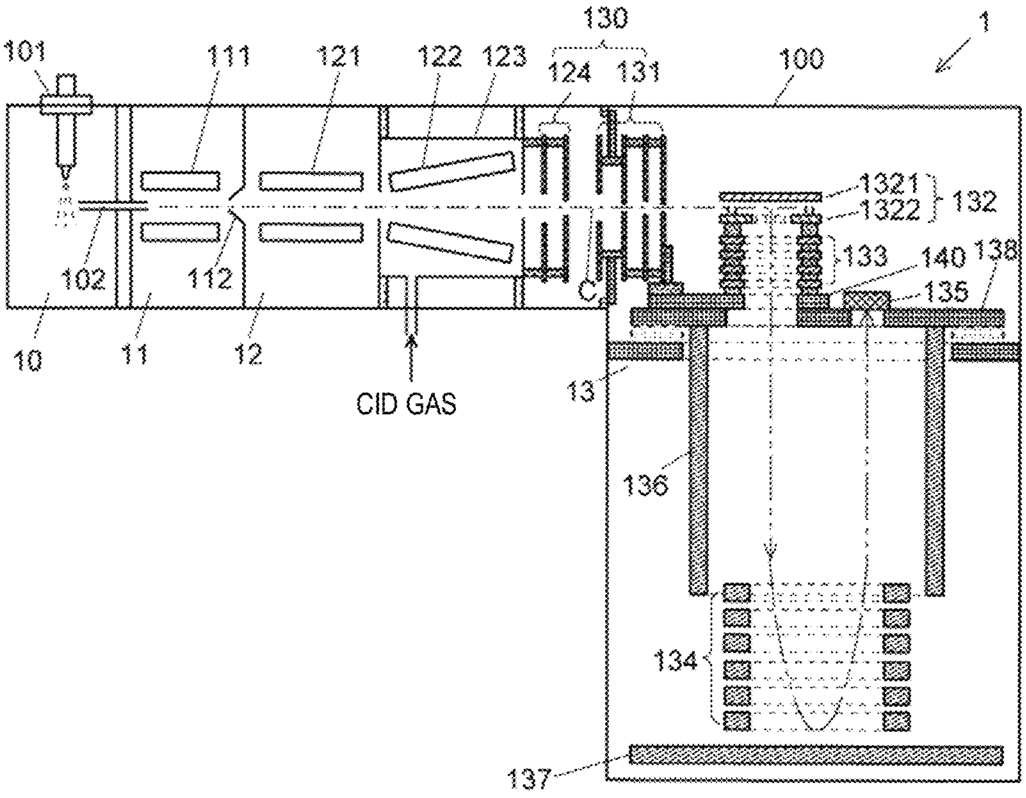
FIG. 1 is an entire configuration diagram of a mass spectrometer that is an embodiment of an orthogonal acceleration time-of-flight mass spectrometer according to the present invention.

FIG. 1 illustrates a schematic configuration of a mass spectrometer 1 of the present embodiment. The mass spectrometer 1 is configured by connecting an ionizer in which an ionization chamber 10 is provided and a vacuum chamber 100. In the vacuum chamber 100, a first intermediate vacuum chamber 11, a second intermediate vacuum chamber 12, and an analysis chamber 13 are provided. The ionization chamber 10 has a substantially atmospheric pressure. The first intermediate vacuum chamber 11, the second intermediate vacuum chamber 12, and the analysis chamber 13 have a configuration of a differential exhaust system with which the degrees of vacuum of the chambers are higher in this order in a stepwise manner.

In the ionization chamber 10 there is disposed an electrospray ion (ESI) source 101 that applies electric charge to a liquid sample and nebulizes the liquid sample so that the liquid sample is ionized. In this embodiment, an ion source is the ESI source, but another ion source can also be used. Alternatively, the ion source may be an ion source that ionizes a gas sample and a solid sample. Ions generated in the ionization chamber 10 enter the first intermediate vacuum chamber 11 through a capillary 102 disposed in a bulkhead member on the first intermediate vacuum chamber 11. The capillary 102 is heated by a heat source that is not illustrated.

The ions generated in the ionization chamber 10 are drawn into the first intermediate vacuum chamber 11 due to a pressure difference between a pressure in the ionization chamber 10 (substantially atmospheric pressure) and a pressure in the first intermediate vacuum chamber 11. At this time, the ions pass through inside the heated capillary 102, so that a solvent is removed. A multipole ion guide 111 is disposed in the first intermediate vacuum chamber 11, and an ion beam is converged in the vicinity of an ion optical axis C by the multipole ion guide 111. The ion beam converged in the first intermediate vacuum chamber 11 enters the second intermediate vacuum chamber 12 through a hole at a top part of a skimmer cone 112 provided at a bulkhead member between the first intermediate vacuum chamber 11 and the second intermediate vacuum chamber 12.

In the second intermediate vacuum chamber 12, there are disposed: a quadrupole mass filter 121 configured to separate the ions depending on a mass-to-charge ratio; a collision cell 123 equipped with a multipole ion guide 122 inside the collision cell 123; and a former stage transfer electrode 124 (a former stage part of a transfer electrode 130 configured to transport ions from the collision cell 123 to an orthogonal acceleration section 132) configured to transport the ions discharged from the collision cell 123. Inside the collision cell 123, a collision-induced dissociation (CID) gas such as argon or nitrogen is supplied continuously or intermittently. The multipole ion guide 122 disposed inside the collision cell 123 is disposed such that a space surrounded by a plurality of rod electrodes is gradually wider (spreads out wide) toward an exit of the collision cell 123. Since the above configuration is employed, only by applying a radio-frequency voltage to each rod electrode, it is possible to form a potential gradient to transport the ions toward the exit of the collision cell 123.

A bulkhead part 164 is provided between the second intermediate vacuum chamber 12 and the analysis chamber 13. The bulkhead part 164 includes an extension part 1641 extending from the inner wall surface of the vacuum chamber 100 and a bulkhead member 1642 fixed to the extension part 1641 adjacent to the analysis chamber 13 side with a plurality of screws 1643 (see FIGS. 2 to 4). In this embodiment, for convenience, the vacuum chamber 100 and the extension part 1641 are described as separate members, but the extension part 1641 may be integrated with the vacuum chamber 100.

In the analysis chamber 13, there are provided: a subsequent stage transfer electrode 131 (a subsequent stage part of the transfer electrode 130 to transport ions from the collision cell 123 to the orthogonal acceleration section 132) configured to transport the ions having entered from the second intermediate vacuum chamber 12 to the orthogonal acceleration section 132; the orthogonal acceleration section 132 constituted by an expulsion electrode 1321 and a lead-in electrode 1322 disposed opposite each other to sandwich the ion optical axis C (the orthogonal acceleration region); a second acceleration section 133 configured to accelerate the ions sent out toward a flight space by the orthogonal acceleration section 132; a reflectron 134 forming a turnover trajectory of the ions in the flight space; a detector 135; and a flight tube 136 and a back plate 137 located on an outer periphery of the flight space. The reflectron 134, the flight tube 136, and the back plate 137 define the flight space of the ions.

The multipole ion guide 111 disposed in the first intermediate vacuum chamber 11, and the quadrupole mass filter 121 and the collision cell 123 disposed in the second intermediate vacuum chamber 12 are each positioned by being fixed to a wall surface of the vacuum chamber 100. In addition, the former stage transfer electrode 124 disposed in the second intermediate vacuum chamber 12 is positioned by being fixed to the collision cell 123.

The mass spectrometer 1 of the present embodiment is characterized by the arrangement of each part in the analysis chamber 13, particularly a configuration for fixing the subsequent stage transfer electrode 131.

Figure 2:
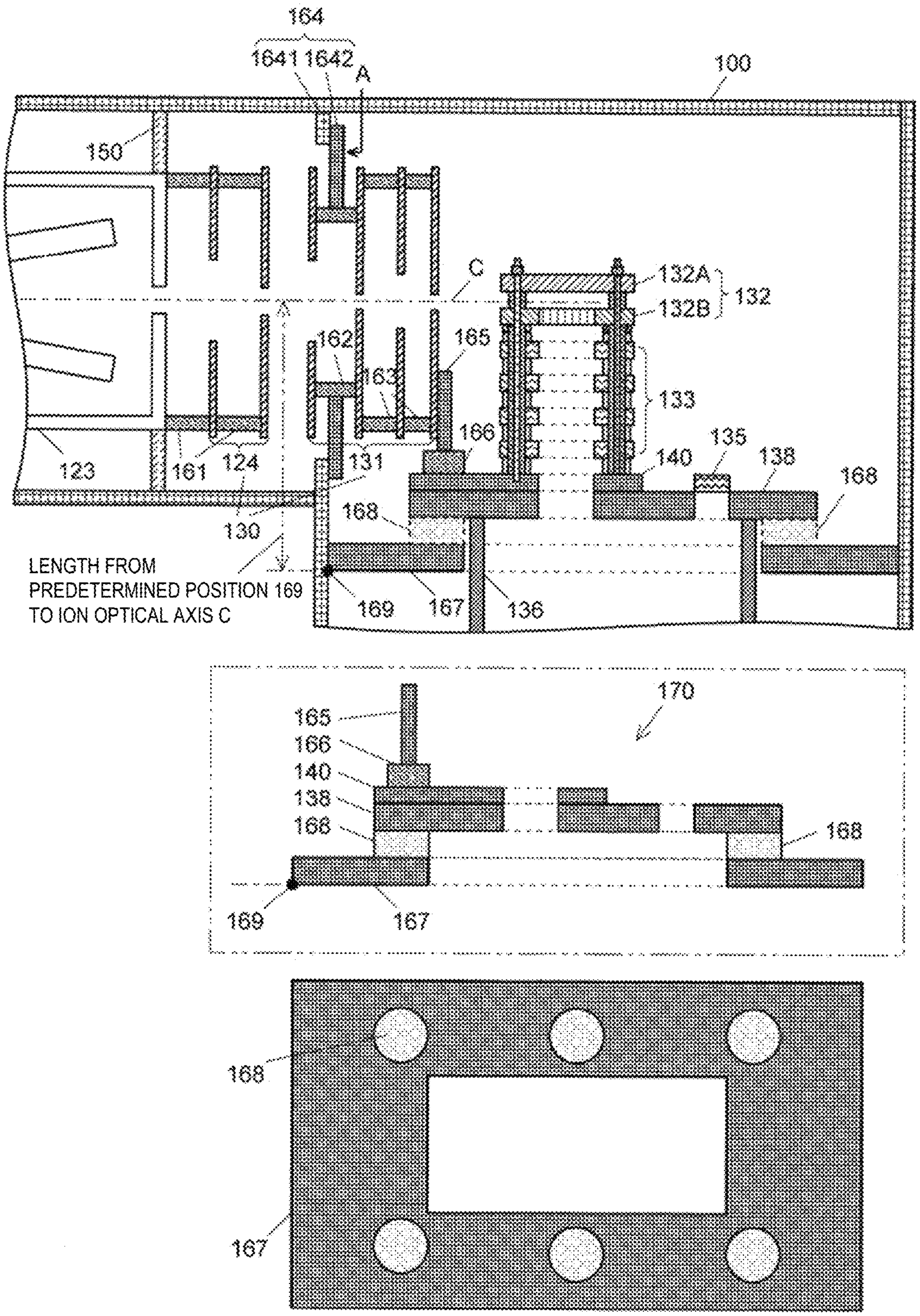
FIG. 2 is an enlarged view of the vicinity of a subsequent stage transfer electrode of the mass spectrometer of the present embodiment.
Figure 3:
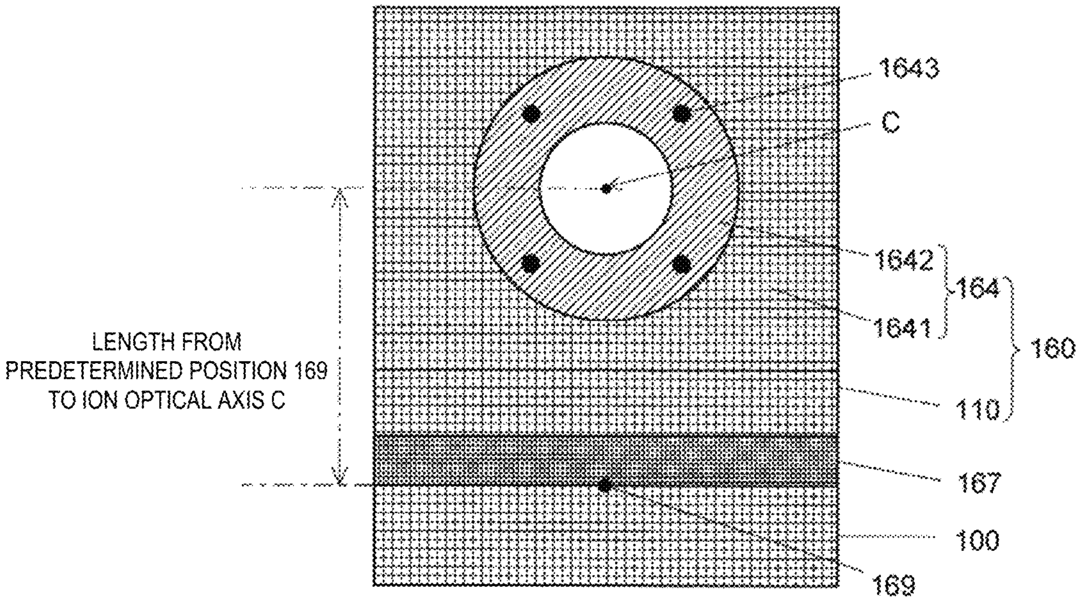
FIG. 3 is a diagram for explaining a configuration of a first fixation member of the mass spectrometer of the present embodiment.

FIG. 2 is an enlarged view (the upper drawing) of the vicinity of the transfer electrode 130, a configuration view (the middle drawing) of a second fixation member 170 to be described later, and a view (the lower drawing) illustrating an arrangement of a second insulating member 168 on the upper surface of a base member 167 to be described later. FIG. 3 is an arrow view of a configuration of a first fixation member 160 to be described later as viewed from A illustrated in FIG. 2. The transfer electrode 130 includes a former stage transfer electrode 124 disposed in the second intermediate vacuum chamber 12 and a subsequent stage transfer electrode 131 disposed in and between the second intermediate vacuum chamber 12 and the analysis chamber 13.

Figure 4:
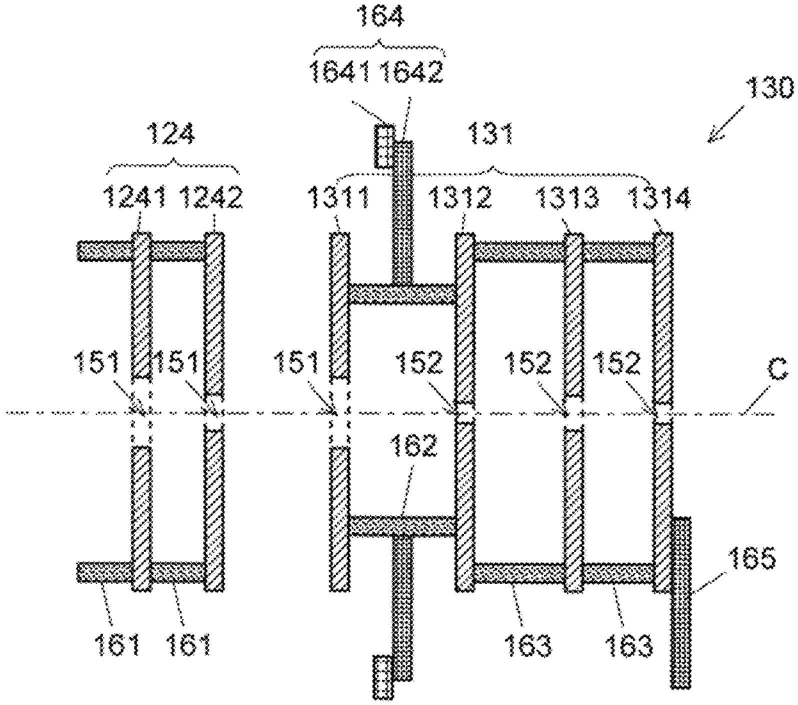
FIG. 4 is a diagram for explaining a configuration of a transfer electrode of the mass spectrometer of the present embodiment.
Figure 5:
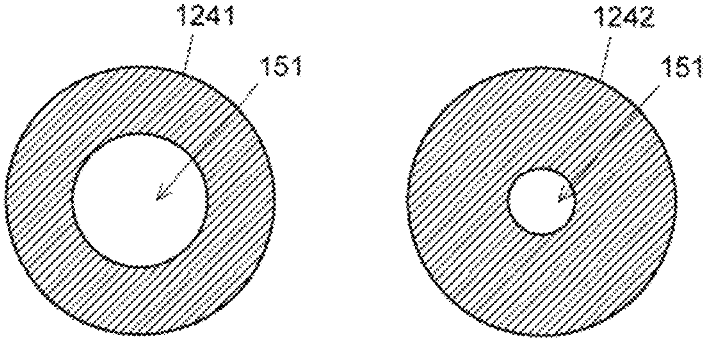
FIG. 5 is a diagram for explaining the shapes of openings of lens electrodes constituting the transfer electrode of the mass spectrometer of the present embodiment.

As illustrated in FIG. 4, the former stage transfer electrode 124 includes two ring electrodes 1241 and 1242. The two ring electrodes 1241 and 1242 are fixed to each other via insulating members 161. The ring electrode 1241 located on the frontmost stage side of the former stage transfer electrode 124 is fixed to the collision cell 123 via the insulating members 161, and this arrangement positions the former stage transfer electrode 124. The collision cell 123 is fixed to the vacuum chamber 100 via a fixation member 150. At the center of each of the ring electrodes 1241 and 1242, an opening 151 that allows ions to pass through is provided. As illustrated in FIG. 5, the ring electrode 1241 is provided with an opening 151 with a diameter larger than that of the ring electrode 1242.

The subsequent stage transfer electrode 131 includes four ring electrodes 1311, 1312, 1313, and 1314. The four ring electrodes 1311, 1312, 1313, and 1314 are also fixed to each other via insulating members 162 and 163. The ring electrode 1311 located on the frontmost stage side (the side on the ionization chamber 10) is disposed in the second intermediate vacuum chamber 12, and the remaining ring electrodes 1312, 1313, and 1314 are disposed in the analysis chamber 13. In addition, the insulating member 162 connecting the two ring electrodes 1311 and 1312 on the former stage side has an outer shape corresponding to an opening part provided in the bulkhead member 1642 partitioning the second intermediate vacuum chamber 12 and the analysis chamber 13, and the insulating member 162 is inserted into the opening part. Thus, the insulating member 162 is fixed to be slidable only in the direction of the ion optical axis C. The outer shape of the insulating member 162 in the present embodiment is circular. The insulating member 162 corresponds to the insulating spacer member in the present invention, and the insulating member 163 corresponds to the connecting member in the present invention.

Figure 6:
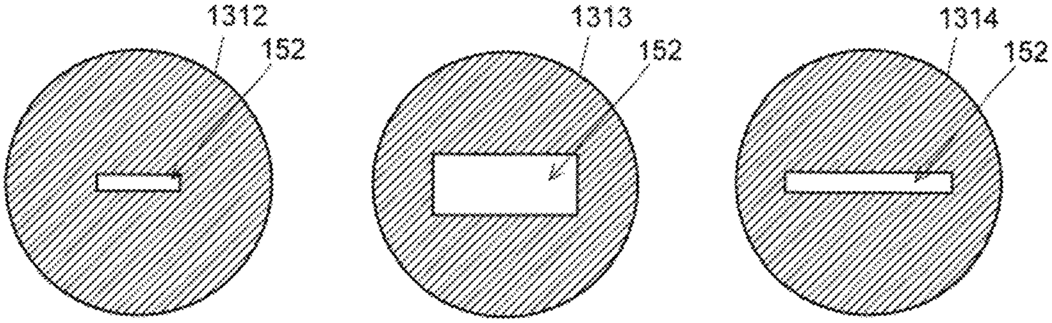
FIG. 6 is another diagram for explaining the shapes of openings of lens electrodes constituting the transfer electrode of the mass spectrometer of the present embodiment.

The ring electrode 1311 disposed in the second intermediate vacuum chamber 12 is provided with an opening 151 having a circular shape with a diameter larger than that of the opening 151 of the ring electrode 1242. The ring electrodes 1312, 1313, and 1314 disposed in the analysis chamber 13 are provided with openings 152 (slits) having a rectangular shape. As illustrated in FIG. 6, the size of the openings 152 increases in the order of the ring electrodes 1312, 1314, and 1313. The shape of the opening 152 having a rectangular shape is a rectangle corresponding to the shape of the opening of an ion incident surface of the orthogonal acceleration section 132 located at the subsequent stage.

A plate-shaped base member 167 in which a rectangular opening is formed at the center is fixed to a predetermined position 169 (corresponding to the predetermined position in the second vacuum chamber in the present invention) of a side wall of the vacuum chamber 100 in the analysis chamber 13. In this embodiment, for convenience, the vacuum chamber 100 and the base member 167 are described as separate members, but the base member 167 may be integrated with the vacuum chamber 100. In addition, a total of six second insulating members 168 having a columnar shape are fixed on the upper surface of the base member 167, three being on each side across the opening of the base member 167. Furthermore, a base plate 138 made of a conductive material, in which two ion passing openings are formed, is fixed to the upper parts of the six second insulating members 168. Furthermore, a positioning plate 140 having a rectangular plate shape that is made of a conductive material and in which an ion passing opening is formed is fixed to the upper surface of the base plate 138. The ring electrode 1314 located at the rearmost stage among the subsequent stage transfer electrodes 131 is fixed to the positioning plate 140 via a conductive member 165 and a first insulating member 166.

Figure 7:
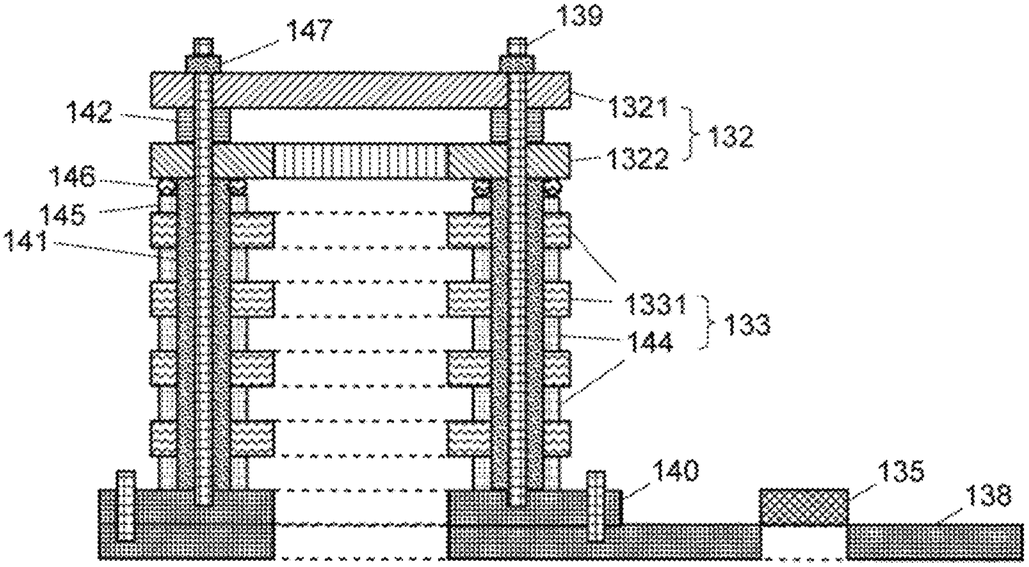
FIG. 7 is a diagram for explaining a configuration of an ion acceleration unit of the mass spectrometer of the present embodiment.

As illustrated in FIG. 7, an ion acceleration unit including: an orthogonal acceleration section 132 that is constituted by an expulsion electrode 1321 and a lead-in electrode 1322; and a second acceleration section 133 is also fixed on the positioning plate 140. The detector 135 is also fixed on the base plate 138.

In the ion acceleration unit, the second acceleration section 133 in which a plurality of sets of four ring-shaped insulating members 144 (one for each rod-shaped member 139 described later) and one acceleration electrode 1331 are alternately disposed is disposed on a positioning plate 140; the lead-in electrode 1322 is disposed above the second acceleration section 133 via four insulating members 145 having a ring shape and four elastic members 146 having a ring shape (one for each rod-shaped member 139); and the expulsion electrode 1321 is disposed above the lead-in electrode 1322 via the four insulating members 142 having a ring shape (one for each rod-shaped member 139). The acceleration electrode 1331 has a rectangular plate shape. An opening that allows ions to pass through is provided at the center of the acceleration electrode 1331, and other openings into which the rod-shaped members 139 and the spacer members 141 are inserted are provided at the four corners. A rod-shaped member 139 is erected at each of the four corners of the positioning plate 140, and the position (height) of the lead-in electrode 1322 is defined by the spacer members 141 disposed on the outer periphery of each rod-shaped member 139. The insulating members 144 and 145 are disposed on the outer periphery of each spacer member 141, and the insulating members 142 are disposed on the outer periphery of each rod-shaped member 139.

Mass spectrometers are assembled in a factory in a room temperature (e.g., 25° C.) environment. On the other hand, when mass spectrometry is performed, the analysis chamber 13 is heated and temperature controlled to a predetermined temperature (for example, 45° C.). As a result, each member expands according to the thermal expansion coefficient of the material constituting the member. In addition, even in a case where the target temperature for temperature control is changed or in a case where a temperature change occurs during transportation of the device, each member expands or contracts according to the thermal expansion coefficient of the material constituting the member.

In the mass spectrometer 1 of the present embodiment, the transfer electrode 130 (the former stage transfer electrode 124 and the subsequent stage transfer electrode 131) is positioned with high accuracy such that the central axis (the ion optical axis C) of the transfer electrode 130 passes between the opposing faces of the expulsion electrode 1321 and the lead-in electrode 1322 constituting the orthogonal acceleration section 132 and is parallel to the opposing faces at the time of manufacturing in a factory. In the subsequent stage transfer electrode 131 of the mass spectrometer 1 of the present embodiment, the insulating member 162 disposed in and between the second intermediate vacuum chamber 12 and the analysis chamber 13 (corresponding to the first vacuum chamber and the second vacuum chamber in the present invention) that sandwich the bulkhead part 164 is positioned (fixed to be slidable only in the direction of the ion optical axis C) with respect to a predetermined position 169 of the vacuum chamber 100 via the bulkhead member 1642, the extension part 1641, and a part of the vacuum chamber 100 (a portion between the base part of the extension part 1641 and the predetermined position 169, this portion being hereinafter referred to as "partial vacuum chamber 110"). That is, in the present embodiment, the bulkhead member 1642, the extension part 1641, and the partial vacuum chamber 110 constitute the first fixation member 160, and the ion optical axis C is positioned at the center position of the insulating member 162 by these members.

As illustrated in FIG. 3, the bulkhead member 1642 is fixed to the extension part 1641 with the screws 1643 at four symmetrical positions around the ion optical axis C. Therefore, when the bulkhead member 1642 expands or contracts, the size of the central opening changes, but the ion optical axis C is not displaced. The displacement of the ion optical axis C means a change in the position of the ion optical axis C with respect to the predetermined position 169 as a reference position. Therefore, in the present embodiment, the extension part 1641 and the partial vacuum chamber 110 of the first fixation member 160 constitute the first displacement member.

The ring electrode 1314 located at the rearmost stage of the subsequent stage transfer electrode 131 is fixed to the base member 167 fixed at the predetermined position 169 of the vacuum chamber 100 via the conductive member 165, the first insulating member 166, the positioning plate 140, the base plate 138, and the second insulating member 168. That is, in the present embodiment, the conductive member 165, the first insulating member 166, the positioning plate 140, the base plate 138, the second insulating member 168, and the base member 167 constitute the second fixation member 170, and the ion optical axis C is positioned at the center position of the ring electrode 1314 by these members. All of these members displace the ion optical axis C by expansion or contraction. Therefore, in the present embodiment, the second fixation member 170 and the second displacement member are the same.

Figure 8:
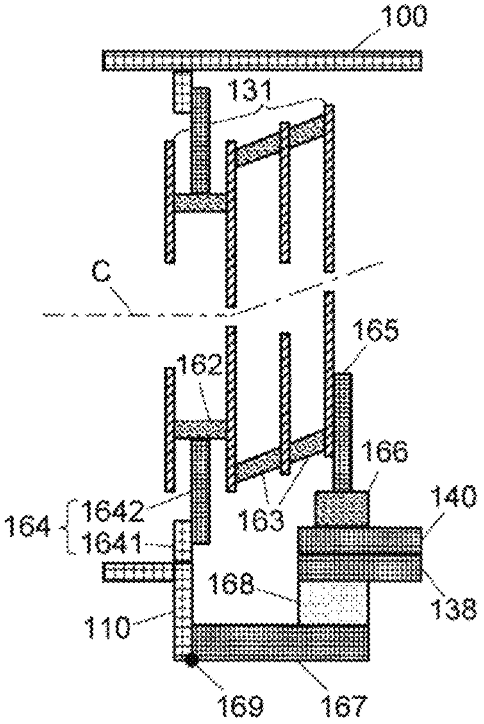
FIG. 8 is a diagram for explaining a deviation of an ion optical axis in the prior art.

In a conventional mass spectrometer, aluminum is used for the vacuum chamber 100 (partial vacuum chamber 110), the extension part 1641, the conductive member 165, and the base plate 138, and PEEK is used for the first insulating member 166 and the second insulating member 168. Therefore, the thermal expansion amount in the same direction as the second displacement member made of the aluminum members and the PEEK members is larger than the thermal expansion amount in a vertical direction (a predetermined direction orthogonal to the ion optical axis C in the present invention) in FIGS. 2 and 4 of the first displacement member made of only the aluminum members. As a result, as illustrated in FIG. 8, there is a deviation in the ion optical axis C, and the efficiency of introducing ions into the orthogonal acceleration section 132 deteriorates, and the detection sensitivity deteriorates, or the mass-resolving power and the mass accuracy deteriorate. In FIG. 8, the thermal expansion amount of each member is made larger than the actual thermal expansion amount in order to clearly represent the deviation of the ion optical axis C. The bulkhead member 1642 of the present embodiment includes a polyacetal resin (POM), but as described above, thermal expansion of the bulkhead member 1642 does not displace the ion optical axis C, and thus is not included in the first displacement member.

In the present embodiment, the vacuum chamber 100 (partial vacuum chamber 110), the conductive member 165, the positioning plate 140, and the base plate 138 are made of the same type of conductive material. As the conductive material, for example, aluminum is used in the same manner as in the prior art. However, making all the conductive members with the same conductive material is not a requirement of the present invention, and different types of conductive materials may be used. For example, stainless steel (SUS) may be used instead of aluminum.

A first insulating material having a thermal expansion coefficient smaller than that of the conductive material is used for the first insulating member 166, and a second insulating material having a thermal expansion coefficient larger than that of the conductive material is used for the second insulating member 168. For example, when the conductive material is aluminum, PEEK can be used as the second insulating material, and a nitride-based machinable ceramic, which is a machinable ceramic having good processability, can be used as the first insulating material. As the first insulating material, for example, boron nitride can also be used, but it is preferable to use machinable ceramics such as nitride-based machinable ceramics and mica machinable ceramics.

As described above, in the mass spectrometer 1 of the present embodiment, since the first insulating material having a thermal expansion coefficient smaller than that of the conductive material is used for the first insulating member 166 and the second insulating material having a thermal expansion coefficient larger than that of the conductive material is used for the second insulating member 168, the length (the design length in a vertical direction of the members positioned between the predetermined position 169 and the ion optical axis C in FIG. 2) of each member is appropriately adjusted according to the thermal expansion coefficients of these two insulating members. Specifically, the difference between the thermal expansion amount of the first displacement member (the sum of product of the length in the predetermined direction and the thermal expansion coefficient of each member constituting the first displacement member) per unit temperature and the thermal expansion amount of the second displacement member per unit temperature is suppressed to 30% or less of the thermal expansion amount of the first displacement member. As a result, in FIG. 2, the displacement amount of the ion optical axis C in the vertical direction due to the thermal expansion of the first displacement member and the displacement amount of the ion optical axis C in the vertical direction due to the thermal expansion of the second displacement member are made approximately the same, and it is possible to suppress the occurrence of a deviation in the ion optical axis C even if the temperature is different between the time of manufacturing and the time of mass analysis. In addition, even in a case where the target temperature of the temperature control of the flight tube 136 is changed, it is possible to suppress the occurrence of a deviation in the ion optical axis C. Furthermore, even in a case where thermal expansion/contraction occurs due to a temperature change in the transport process of the mass spectrometer 1, the displacement of the ion optical axis C due to the thermal expansion/contraction of the first displacement member and the displacement of the ion optical axis C due to the thermal expansion/contraction of the second displacement member are substantially the same, so that an irreversible large deviation does not occur in the ion optical axis C.

EXAMPLES

Hereinafter, specific examples will be described. In the present example, aluminum was used for the vacuum chamber 100 (partial vacuum chamber 110), the extension part 1641, the conductive member 165, the positioning plate 140, the base plate 138, and the base member 167; PEEK was used for the second insulating member 168; and Photoveel II (registered trademark of Ferrotec Material Technologies Corporation) described in Non Patent Literature 1 was used for the first insulating member 166. Photoveel II is a type of machinable ceramic that is nitride based. In addition, a configuration using PEEK for the first insulating member 166 in the same manner as in the prior art is defined as a comparative example (prior art). In both the example and comparative example, the bulkhead member 1642 made of POM is used.

Table 1 shows the material, length (designed length in the vertical direction in FIG. 2), thermal expansion coefficient, and thermal expansion amount of each member constituting the first displacement member, which are common to the example and comparative example.

TABLE 1

| Member name | Code | Material | Length [mm] | Thermal expansion coefficient (1/K) | Thermal expansion amount (+30° C., mm) |
|---|---|---|---|---|---|
| Extension part | 1641 | Aluminum | 157 | 2.37E−05 | 1.12E−01 |
| Partial vacuum chamber | 110 | | | | |
| Overall | | | 157 | 2.37E−05 | 1.12E−01 |

Table 2 shows the material, length (designed length in the vertical direction in FIG. 2), thermal expansion coefficient, and thermal expansion amount of each member constituting the second displacement member in the comparative example. The numerical values shown at the bottom are the length, thermal expansion coefficient, and thermal expansion amount of the second displacement member as a whole.

TABLE 2

| Member name | Code | Material | Length [mm] | Thermal expansion coefficient (1/K) | Thermal expansion amount (+30° C., mm) |
|---|---|---|---|---|---|
| Conductive member | 165 | Aluminum | 29 | 2.37E−05 | 2.06E−02 |
| First insulating member | 166 | PEEK | 15 | 5.00E−05 | 2.25E−02 |
| Positioning plate | 140 | Aluminum | 15 | 2.37E−05 | 1.07E−02 |
| Base plate | 138 | Aluminum | 15 | 2.37E−05 | 1.07E−02 |
| Second insulating member | 168 | PEEK | 29 | 5.00E−05 | 4.35E−02 |
| Base member | 167 | Aluminum | 54 | 2.37E−05 | 3.84E−02 |
| Overall | | | 157 | 3.10E−05 | 1.46E−01 |

Table 3 shows the material, length (designed length in the vertical direction in FIG. 2), thermal expansion coefficient, and thermal expansion amount of each member constituting the second displacement member in the examples. The numerical values shown at the bottom are the length, thermal expansion coefficient, and thermal expansion amount of the second displacement member as a whole.

TABLE 3

| Member name | Code | Material | Length [mm] | Thermal expansion coefficient (1/K) | Thermal expansion amount (+30° C., mm) |
|---|---|---|---|---|---|
| Conductive member | 165 | Aluminum | 29 | 2.37E−05 | 2.06E−02 |
| First insulating member | 166 | Photoveel II | 15 | 1.40E−06 | 6.28E−04 |
| Positioning plate | 140 | Aluminum | 15 | 2.37E−05 | 1.06E−02 |
| Base plate | 138 | Aluminum | 15 | 2.37E−05 | 1.07E−02 |
| Second insulating member | 168 | PEEK | 29 | 5.00E−05 | 4.35E−02 |
| Base member | 167 | Aluminum | 54 | 2.37E−05 | 3.83E−02 |
| Overall | | | 157 | 2.63E−05 | 1.24E−01 |

As calculated from the numerical values shown in Tables 1 and 2, in the comparative example, the thermal expansion coefficient of the first displacement member is $2.37\times10^{-5}$ (1/K), the thermal expansion coefficient of the second displacement member is $3.10\times10^{-5}$ (1/K), and the ratio of the thermal expansion coefficient of the second displacement member to the thermal expansion coefficient of the first displacement member (the thermal expansion coefficient of the second displacement member/the thermal expansion coefficient of the first displacement member) is 1.31. That is, the thermal expansion coefficient of the second displacement member is 31% larger than the thermal expansion coefficient of the first displacement member. In addition, the thermal expansion amount of the first displacement member per unit temperature (1 degree) is $3.72\times10^{-3}$ mm, the thermal expansion amount of the second displacement member per unit temperature is $4.87\times10^{-3}$ mm, and the difference $1.15\times10^{-3}$ mm is 31% of the thermal expansion amount of the first displacement member. Furthermore, the difference between the thermal expansion amount of the second displacement member (the displacement amount of the ion optical axis C due to the thermal expansion of the second displacement member) and the thermal expansion amount of the first displacement member (the displacement amount of the ion optical axis C due to the thermal expansion of the first displacement member) in the vertical direction of FIG. 2 when the temperature rises by 30° C. is 0.035 mm.

On the other hand, as calculated from the numerical values shown in Tables 1 and 3, in the examples, the thermal expansion coefficient of the first displacement member is $2.37\times10^{-5}$ (l/K), the thermal expansion coefficient of the second displacement member is $2.63\times10^{-5}$ (l/K), and the ratio of the thermal expansion coefficient of the second displacement member to the thermal expansion coefficient of the first displacement member (the thermal expansion coefficient of the second displacement member/the thermal expansion coefficient of the first displacement member) is 1.11. That is, the thermal expansion coefficient of the second displacement member is suppressed to a value 11% larger than the thermal expansion coefficient of the first displacement member. In addition, the thermal expansion amount of the first displacement member per unit temperature (1 degree) is $3.72\times10^{-3}$ mm, the thermal expansion amount of the second displacement member per unit temperature is $4.13\times10^{-3}$ mm, and the difference $0.41\times10^{-3}$ mm is 11% of the thermal expansion amount of the first displacement member. Furthermore, the difference between the thermal expansion amount of the second displacement member (the displacement amount of the ion optical axis C due to the thermal expansion of the second displacement member) and the thermal expansion amount of the first displacement member (the displacement amount of the ion optical axis C due to the thermal expansion of the first displacement member) at the time of a temperature rise of 30° C. is also suppressed to 0.013 mm, and it can be seen that the deviation of the ion optical axis C is suppressed to about ⅓ as compared with the comparative example by adopting the configuration of the example. It is also possible to suppress this difference to substantially zero by more finely adjusting the length of each member.

The above-described embodiment and example are merely an example, and can be appropriately modified in accordance with the spirit of the present invention.

Figure 9:
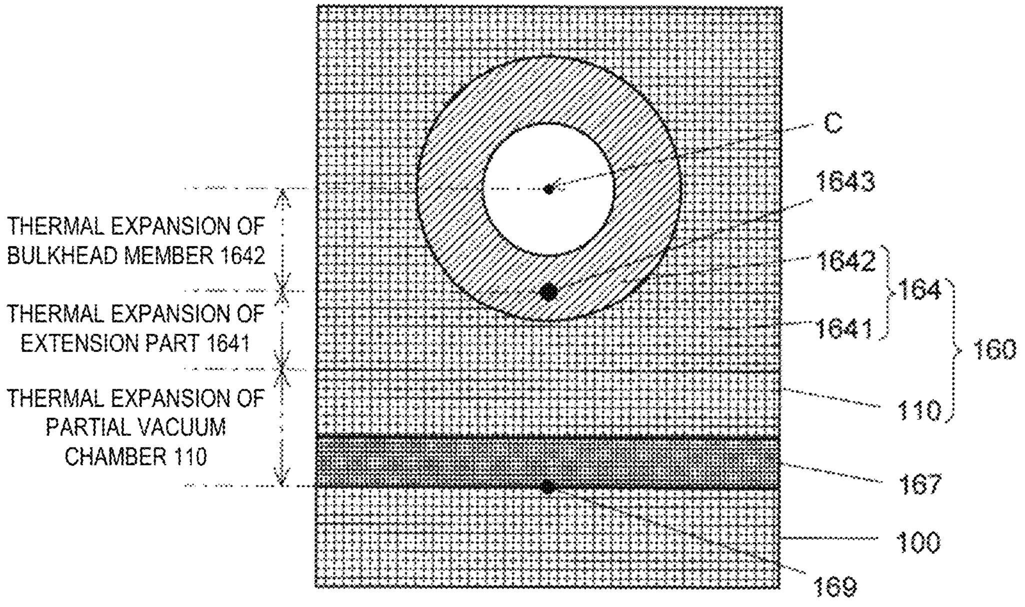
FIG. 9 is another configuration example of the first displacement member in the mass spectrometer of the present embodiment.

In the above embodiment and example, as illustrated in FIG. 3, the bulkhead member 1642 is fixed to the extension part 1641 with the screws 1643 at symmetrical positions with respect to the ion optical axis C, and since the ion optical axis C is configured so as not to be displaced even if the bulkhead member 1642 is thermally expanded, the bulkhead member 1642 is not included in the first displacement member, but the ion optical axis C may be displaced by the thermal expansion of the bulkhead member 1642 depending on the position where the bulkhead member 1642 is fixed to the extension part 1641. For example, in a case where the bulkhead member 1642 is fixed to the extension part 1641 with a screw 1643 only at one place, the first displacement member includes the partial vacuum chamber 110, the extension part 1641, and the bulkhead member 1642, and it is necessary to consider thermal expansion of each of these members as illustrated in FIG. 9.

In addition, in the example and embodiment described above, the subsequent stage transfer electrode 131 is configured as being supported and fixed from below, but a configuration in which the subsequent stage transfer electrode 131 is suspended from above and fixed can be adopted.

Figure 10:
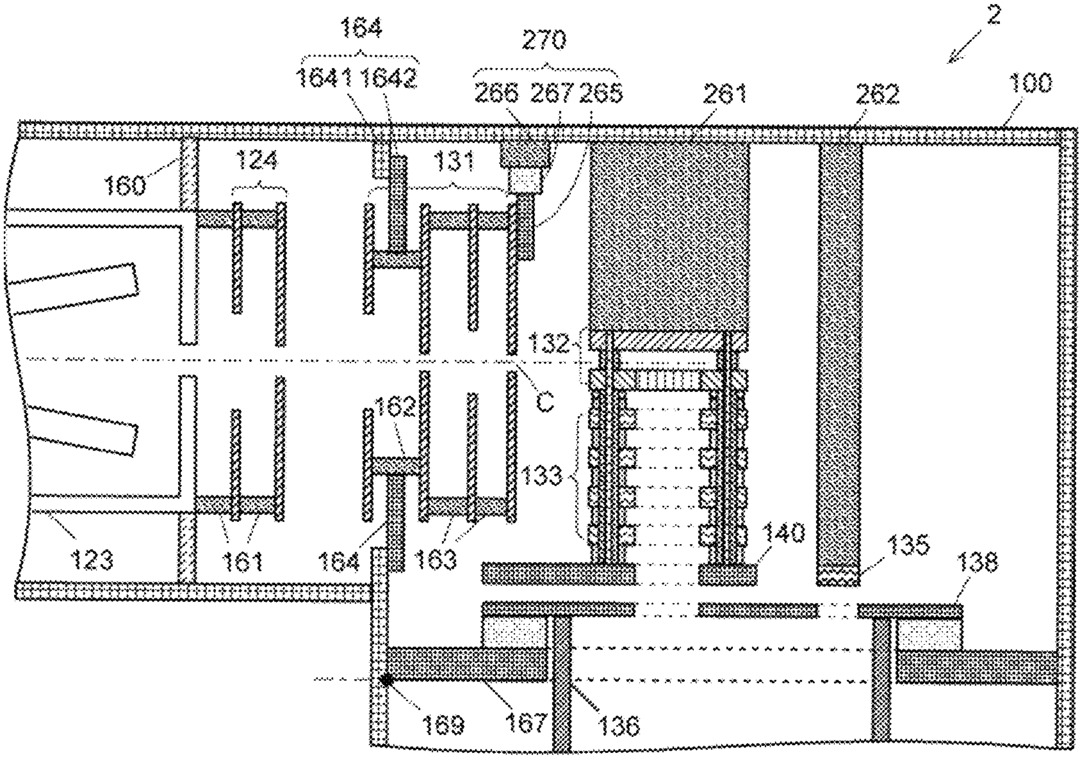
FIG. 10 is an enlarged view of the vicinity of a subsequent stage transfer electrode of an orthogonal acceleration time-of-flight mass spectrometer of a modification.

FIG. 10 illustrates a configuration of an orthogonal acceleration time-of-flight mass spectrometer 2 of a modification in which the subsequent stage transfer electrode 131, the ion acceleration unit, and the detector 135 are suspended from above and fixed. In the modification, the ring electrode 1314 located at the rearmost stage of the subsequent stage transfer electrode 131 is fixed from the upper wall surface of the vacuum chamber 100 via a first insulating member 266, a second insulating member 267, and a conductive member 265. That is, the second fixation member includes the first insulating member 266, the second insulating member 267, and the conductive member 265. In addition, the second fixation member and the second displacement member are the same. The first fixation member and the first displacement member are the same as those in the above embodiment and example (the first displacement member is different depending on a position where the bulkhead member 1642 is fixed to the extension part 1641). The acceleration unit is fixed to the upper wall surface of the vacuum chamber 100 by an insulating member 261, and the ion detector 135 is fixed to the upper wall surface of the vacuum chamber 100 by an insulating member 262.

Also in the modification, when the second insulating member 267 is made of a material (for example, PEEK) having a thermal expansion coefficient larger than that of the material (for example, aluminum) of the extension part 1641 or the conductive member 265, and the first insulating member 266 is made of a material (for example, Photoveel II) having a thermal expansion coefficient smaller than that of the material of the extension part 1641 or the conductive member 265, the same effects as those of the above embodiment can be obtained.

It is also possible to suspend and hold only the subsequent stage transfer electrode 131 from above, but if a member that defines the ion optical axis C and a detector are fixed to different predetermined positions, there is a possibility that a deviation occurs in the ion optical axis C or a deviation occurs between a flight path of the ions and the position of the detector. Therefore, when the subsequent stage transfer electrode 131 is fixed to the upper wall surface of the vacuum chamber 100, it is preferable that the ion acceleration unit and the ion detector are also fixed to the upper wall surface of the vacuum chamber 100 as in the above modification.

In the above embodiment, the transfer electrode is a ring electrode, but a segment multipole rod electrode (multipole rod electrode divided into a plurality of segments along the ion optical axis C) may be used. In addition, in the above example, an ion trap (including LIT and PLIT) can also be used as the orthogonal acceleration section.

The number of members constituting the first fixation member 160 and the second fixation members 170 and 270 and the type of material constituting each member are not limited to those described in the above embodiments, examples, and modifications, and can be appropriately changed as long as the requirements of the present invention are satisfied.

[Modes]

It is understood by those skilled in the art that the plurality of exemplary embodiments described above are specific examples of the following modes.

(Clause 1)

An orthogonal acceleration time-of-flight mass spectrometer according to a mode includes:

- a vacuum chamber in which an internal space is partitioned into a first vacuum chamber and a second vacuum chamber;
- an insulating spacer member disposed in and between the first vacuum chamber and the second vacuum chamber;
- a former-stage-side ring electrode fixed to a side of the insulating spacer member on the first vacuum chamber;
- a plurality of subsequent-stage-side ring electrodes fixed to a side of the insulating spacer member on the second vacuum chamber and connected to each other via a connecting member having an insulation property;
- a first fixation member configured to position the insulating spacer member with respect to a predetermined position in the second vacuum chamber, the first fixation member including a first displacement member configured to displace a central axis of the former-stage-side ring electrode and the subsequent-stage-side ring electrodes in a predetermined direction orthogonal to the central axis by thermal expansion; and
- a second fixation member configured to position one of the plurality of subsequent-stage-side ring electrodes with respect to the predetermined position, the second fixation member including a second displacement member configured to displace the central axis in the predetermined direction orthogonal to the central axis by thermal expansion, a difference between a thermal expansion amount of the first displacement member per unit temperature and a thermal expansion amount of the second displacement member per unit temperature being 30% or less of the thermal expansion amount of the first displacement member.

In the orthogonal acceleration time-of-flight mass spectrometer according to Clause 1, the insulating spacer member is disposed in and between the first vacuum chamber and the second vacuum chamber partitioned in the vacuum chamber. The insulating spacer member is fixed to a predetermined position in the second vacuum chamber by a first fixation member. The first fixation member includes a first displacement member configured to displace a central axis of a former-stage-side ring electrode and subsequent-stage-side ring electrodes in a predetermined direction orthogonal to the central axis by thermal expansion. In addition, the former-stage-side ring electrode is fixed to a side of the insulating spacer member on the first vacuum chamber, and the plurality of subsequent-stage-side ring electrodes are fixed to a side of the insulating spacer member on the second vacuum chamber. Furthermore, one of the plurality of subsequent-stage-side ring electrodes (typically, the ring electrode located at the rearmost stage) is fixed to the predetermined position by the second fixation member. The second fixation member also includes a second displacement member configured to displace the central axis of the former-stage-side ring electrode and the subsequent-stage-side ring electrodes in the predetermined direction orthogonal to the central axis by thermal expansion. Furthermore, a difference between the thermal expansion amount of the first displacement member (sum of product of the length in the predetermined direction and the thermal expansion coefficient of each member constituting the first displacement member) per unit temperature (one degree) and the thermal expansion amount of the second displacement member (sum of product of the length in the predetermined direction and the thermal expansion coefficient of each member constituting the second displacement member) per unit temperature (one degree) is 30% or less of the thermal expansion amount of the first displacement member. Therefore, even in a case where the temperature at the time of assembly of the device is different from the temperature at the time of use, in a case where a target temperature of the temperature control of a flight tube is changed, or in a case where a temperature change occurs in the transport process of the device, the difference between the expansion amount and the contraction amount of both displacement members is small, so that the deviation of the ion optical axis is suppressed, and it is possible to suppress deterioration of device performance such as mass-resolving power, ion detection sensitivity, and mass accuracy.

(Clause 2)

The orthogonal acceleration time-of-flight mass spectrometer according to Clause 1, further including:

- a bulkhead member partitioning the first vacuum chamber and the second vacuum chamber; and
- an extension part provided on an inner wall surface of the vacuum chamber and fixed to the bulkhead member; wherein
- the first fixation member includes the bulkhead member, the extension part, and a part of the vacuum chamber located between the extension part and the predetermined position.

In the orthogonal acceleration time-of-flight mass spectrometer of Clause 2, since the insulating spacer member is fixed using the extension part and the bulkhead member provided to partition the first vacuum chamber and the second vacuum chamber, the number of members can be minimized.

(Clause 3)

The orthogonal acceleration time-of-flight mass spectrometer according to Clause 2, wherein the first displacement member is a part of the extension part and the vacuum chamber.

As an aspect of the orthogonal acceleration time-of-flight mass spectrometer of Clause 2, it is possible to adopt a configuration in which the bulkhead member is fixed to the extension part at symmetrical positions around the ion optical axis. In this case, the first displacement member of the orthogonal acceleration time-of-flight mass spectrometer of Clause 3 is configured by the extension part and a part of the vacuum chamber. Since the orthogonal acceleration time-of-flight mass spectrometer of Clause 3 is not affected by thermal expansion of the bulkhead member, displacement of the ion optical axis can be suppressed.

(Clause 4)

The orthogonal acceleration time-of-flight mass spectrometer according to any one of Clause 1 to Clause 3, wherein a difference between a thermal expansion coefficient of the first displacement member and a thermal expansion coefficient of the second displacement member is 30% or less of the thermal expansion coefficient of the first displacement member.

In the orthogonal acceleration time-of-flight mass spectrometer according to Clause 4, the difference between the thermal expansion coefficient of the first displacement member and the thermal expansion coefficient of the second displacement member is 30% or less of the thermal expansion coefficient of the first displacement member. In many cases, the lengths of the first displacement member and the second displacement member in the predetermined direction are substantially the same, and in these cases, by using the orthogonal acceleration time-of-flight mass spectrometer according to Clause 4, even in a case where the temperature at the time of assembly of the device is different from the temperature at the time of use, in a case where the target temperature for temperature control of the flight tube is changed, or in a case where a temperature change occurs during transportation of the device, it is possible to suppress a difference in the magnitude of expansion or contraction of the first fixation member and the second fixation member and make the difference small, and to suppress the deviation of the ion optical axis.

(Clause 5)

The orthogonal acceleration time-of-flight mass spectrometer according to any one of Clause 1 to Clause 4, wherein the second displacement member includes a member made of an insulating material.

In the orthogonal acceleration time-of-flight mass spectrometer of Clause 5, the vacuum chamber and the subsequent-stage-side ring electrode are insulated from each other by the second displacement member (a member made of an insulating material included in the second displacement member).

(Clause 6)

The orthogonal acceleration time-of-flight mass spectrometer according to any one of Clause 1 to Clause 5, wherein the second displacement member includes a first insulating member made of a first insulating material, a second insulating member made of a second insulating material, and a conductive member made of a conductive material.

In the orthogonal acceleration time-of-flight mass spectrometer according to Clause 6, the thermal expansion amount of the second displacement member can be appropriately adjusted by using two different types of insulating material. Of course, three or more types of insulating materials having different thermal expansion coefficients may be used. In addition, a plurality of conductive materials having different thermal expansion coefficients may be used.

(Clause 7)

The orthogonal acceleration time-of-flight mass spectrometer according to Clause 6, wherein a thermal expansion coefficient of the first insulating material is smaller than a thermal expansion coefficient of the conductive member, and a thermal expansion coefficient of the second insulating material is larger than the thermal expansion coefficient of the conductive member.

Like the orthogonal acceleration time-of-flight mass spectrometer according to Clause 7, the orthogonal acceleration time-of-flight mass spectrometer according to Clause 6 can be configured by including a member made of the first insulating material having the thermal expansion coefficient smaller than that of the conductive material constituting the conductive member and a member made of the second insulating material having the thermal expansion coefficient larger than that of the conductive material.

(Clause 8)

The orthogonal acceleration time-of-flight mass spectrometer according to Clause 6 or Clause 7, wherein the first insulating material is a machinable ceramic.

In the orthogonal acceleration time-of-flight mass spectrometer according to Clause 8, the second fixation member can be manufactured more easily and with high accuracy by using, as the first insulating member, a member made of machinable ceramics having good processability.

(Clause 9)

The orthogonal acceleration time-of-flight mass spectrometer according to any one of Clause 6 to Clause 8, wherein the first insulating material is a nitride-based ceramic.

In the mass spectrometer, since a vacuum chamber member made of aluminum is often used, a nitride-based ceramic can be suitably used as the first insulating material, as in the orthogonal acceleration time-of-flight mass spectrometer according to Clause 9.

REFERENCE SIGNS LIST

1, 2 . . . Mass Spectrometer
100 . . . Vacuum Chamber
110 . . . Partial Vacuum Chamber
10 . . . Ionization Chamber
101 . . . Electrospray Ion Source
11 . . . First Intermediate Vacuum Chamber
111 . . . Multipole Ion Guide
12 . . . Second Intermediate Vacuum Chamber
121 . . . Quadrupole Mass Filter
122 . . . Multipole Ion Guide
123 . . . Collision Cell
124 . . . Former Stage Transfer Electrode
1241, 1242 . . . Ring Electrode
13 . . . Analysis Chamber

131 . . . Subsequent Stage Transfer Electrode
1311 . . . Ring Electrode (Former-Stage-side Ring Electrode)
1312, 1313, 1314 . . . Ring Electrode (Subsequent-Stage-side Ring Electrode)
132 . . . Orthogonal Acceleration Section
1321 . . . Expulsion Electrode
1322 . . . Lead-in Electrode
133 . . . Second Acceleration Section
134 . . . Reflectron
135 . . . Detector
136 . . . Flight Tube
137 . . . Back Plate
138 . . . Base Plate
140 . . . Positioning Plate
160 . . . First Fixation Member
161, 162, 163 . . . Insulating Member
164 . . . Bulkhead Part
1641 . . . Extension Part
1642 . . . Bulkhead Member
165, 265 . . . Conductive Member
166, 266 . . . First Insulating Member
167 . . . Base Member
168, 267 . . . Second Insulating Member
169 . . . Predetermined Position (Fixing Position of Base Member 167)
170 . . . Second Fixation Member
261, 262 . . . Insulating Member
C . . . Ion Optical Axis

The invention claimed is:

1. An orthogonal acceleration time-of-flight mass spectrometer comprising:

a vacuum chamber in which an internal space is partitioned into a first vacuum chamber and a second vacuum chamber;

an insulating spacer member disposed in and between the first vacuum chamber and the second vacuum chamber;

a former-stage-side ring electrode fixed to a side of the insulating spacer member on the first vacuum chamber;

a plurality of subsequent-stage-side ring electrodes fixed to a side of the insulating spacer member on the second vacuum chamber and connected to each other via a connecting member having an insulation property;

a first fixation member configured to position the insulating spacer member with respect to a predetermined position in the second vacuum chamber, the first fixation member including a first displacement member configured to displace a central axis of the former-stage-side ring electrode and the subsequent-stage-side ring electrodes in a predetermined direction orthogonal to the central axis by thermal expansion; and a second fixation member configured to position one of the plurality of subsequent-stage-side ring electrodes with respect to the predetermined position, the second fixation member including a second displacement member configured to displace the central axis in the predetermined direction orthogonal to the central axis by thermal expansion, a difference between a thermal expansion amount of the first displacement member per unit temperature and a thermal expansion amount of the second displacement member per unit temperature being 30% or less of the thermal expansion amount of the first displacement member.

2. The orthogonal acceleration time-of-flight mass spectrometer according to claim 1, further comprising:

a bulkhead member partitioning the first vacuum chamber and the second vacuum chamber; and an extension part provided on an inner wall surface of the vacuum chamber and fixed to the bulkhead member; wherein the first fixation member includes the bulkhead member, the extension part, and a part of the vacuum chamber located between the extension part and the predetermined position.

3. The orthogonal acceleration time-of-flight mass spectrometer according to claim 2, wherein the first displacement member is a part of the extension part and the vacuum chamber.

4. The orthogonal acceleration time-of-flight mass spectrometer according to claim 1, wherein a difference between a thermal expansion coefficient of the first displacement member and a thermal expansion coefficient of the second displacement member is 30% or less of the thermal expansion coefficient of the first displacement member.

5. The orthogonal acceleration time-of-flight mass spectrometer according to claim 1, wherein the second displacement member includes a member made of an insulating material.

6. The orthogonal acceleration time-of-flight mass spectrometer according to claim 1, wherein the second displacement member includes a first insulating member made of a first insulating material, a second insulating member made of a second insulating material, and a conductive member made of a conductive material.

7. The orthogonal acceleration time-of-flight mass spectrometer according to claim 6, wherein a thermal expansion coefficient of the first insulating material is smaller than a thermal expansion coefficient of the conductive member, and a thermal expansion coefficient of the second insulating material is larger than the thermal expansion coefficient of the conductive member.

8. The orthogonal acceleration time-of-flight mass spectrometer according to claim 6, wherein the first insulating material is a ceramic.

9. The orthogonal acceleration time-of-flight mass spectrometer according to claim 6, wherein the first insulating material is a nitride-based ceramic.

* * * * *